United States Patent
Jung et al.

(10) Patent No.: US 10,635,265 B2
(45) Date of Patent: Apr. 28, 2020

(54) MOBILE TERMINAL AND METHOD FOR CONTROLLING SAME

(71) Applicant: LG ELECTRONICS INC., Seoul (KR)

(72) Inventors: Juno Jung, Seoul (KR); Shinkook Kim, Seoul (KR); Hyeongjin Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 438 days.

(21) Appl. No.: 15/502,184

(22) PCT Filed: Apr. 3, 2015

(86) PCT No.: PCT/KR2015/003365
§ 371 (c)(1),
(2) Date: Feb. 6, 2017

(87) PCT Pub. No.: WO2016/021800
PCT Pub. Date: Feb. 11, 2016

(65) Prior Publication Data
US 2017/0228115 A1    Aug. 10, 2017

(30) Foreign Application Priority Data
Aug. 7, 2014 (KR) .......................... 10-2014-0101833

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0486* (2013.01); *G06F 3/0487* (2013.01);
(Continued)

(58) Field of Classification Search
None
See application file for complete search history.

(56) References Cited

U.S. PATENT DOCUMENTS

| 2009/0109898 | A1* | 4/2009 | Adams | H04W 48/06 370/328 |
| 2011/0213827 | A1* | 9/2011 | Kaspar | H04W 76/15 709/203 |
| 2012/0287034 | A1* | 11/2012 | Park | H04L 12/2807 345/156 |

FOREIGN PATENT DOCUMENTS

| JP | 2008013291 | 1/2008 |
| JP | 2009021744 | 1/2009 |

(Continued)

OTHER PUBLICATIONS

PCT International Application No. PCT/KR2015/003365, Written Opinion of the International Searching Authority dated Jul. 13, 2015, 14 pages.

(Continued)

*Primary Examiner* — William C Trapanese
(74) *Attorney, Agent, or Firm* — Lee, Hong, Degerman, Kang & Waimey

(57) ABSTRACT

The present invention relates to a mobile terminal and, more particularly to, a mobile terminal which can exchange data simultaneously using wireless networks according to a plurality of different network addresses and a method for controlling the same. A mobile terminal related to an embodiment of the present invention comprises; a wireless communication unit for simultaneously performing data exchange through the plurality of different network addresses; a touch screen; and a control unit for displaying, on the touch screen, a plurality of display objects corresponding to different network addresses, respectively, and controlling the wireless communication unit to exchange (Continued)

data simultaneously using networks according to network addresses corresponding to selected display objects when two or more of the plurality of display objects are selected.

16 Claims, 18 Drawing Sheets

(51) Int. Cl.

| | | |
|---|---|---|
| *H04L 12/24* | (2006.01) | |
| *G06F 3/0481* | (2013.01) | |
| *G06F 3/0487* | (2013.01) | |
| *G06F 3/0486* | (2013.01) | |
| *H04M 1/725* | (2006.01) | |
| *H04W 48/18* | (2009.01) | |
| *G06F 3/0488* | (2013.01) | |
| *H04W 88/06* | (2009.01) | |

(52) U.S. Cl.
CPC .......... *G06F 3/04817* (2013.01); *H04L 41/12* (2013.01); *H04L 41/22* (2013.01); *H04M 1/72519* (2013.01); *H04W 48/18* (2013.01); *G06F 3/0488* (2013.01); *H04W 88/06* (2013.01)

(56) References Cited

FOREIGN PATENT DOCUMENTS

| | | |
|---|---|---|
| KR | 101064002 | 9/2011 |
| KR | 1020130006385 | 1/2013 |
| KR | 1020130077137 | 7/2013 |
| KR | 1020130100485 | 9/2013 |

OTHER PUBLICATIONS

Korean Intellectual Property Office Application No. 10-2014-0101833, Notice of Allowance dated Jul. 4, 2016, 3 pages.

* cited by examiner

FIG. 8
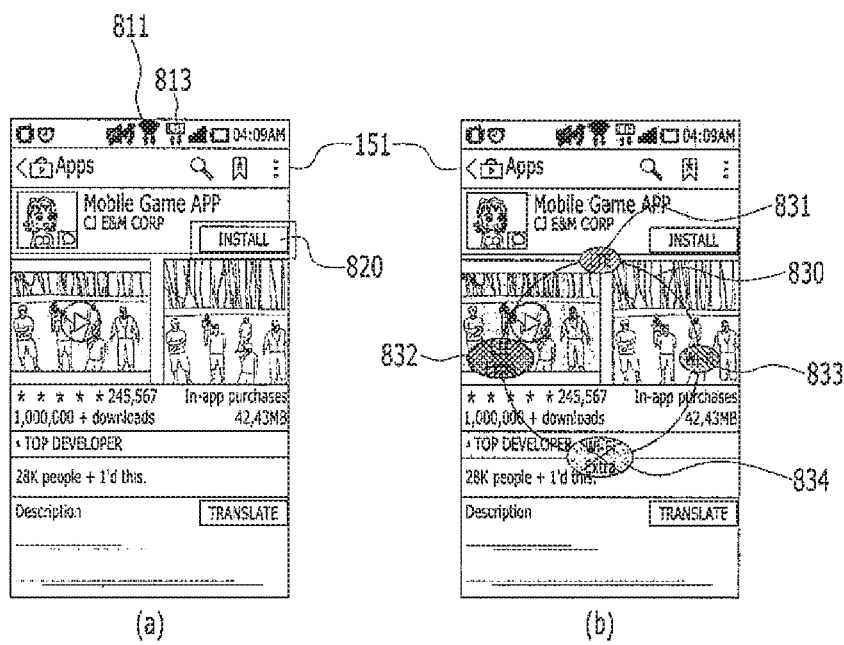
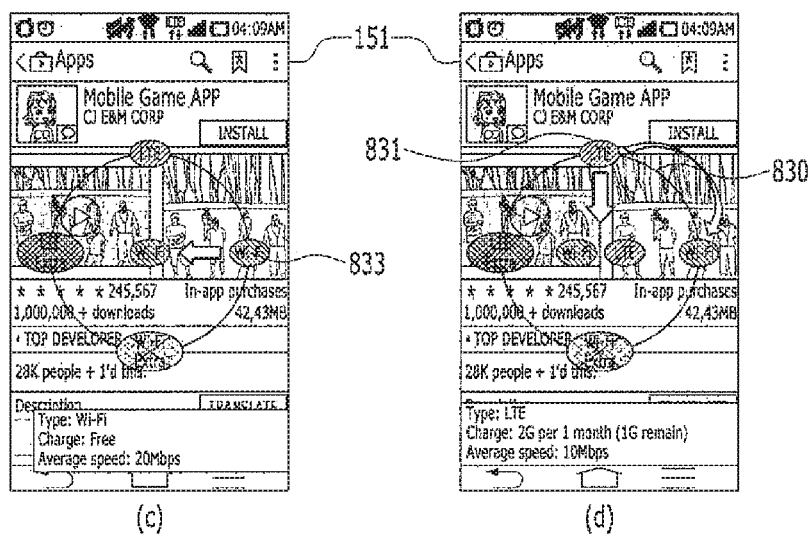

FIG. 9
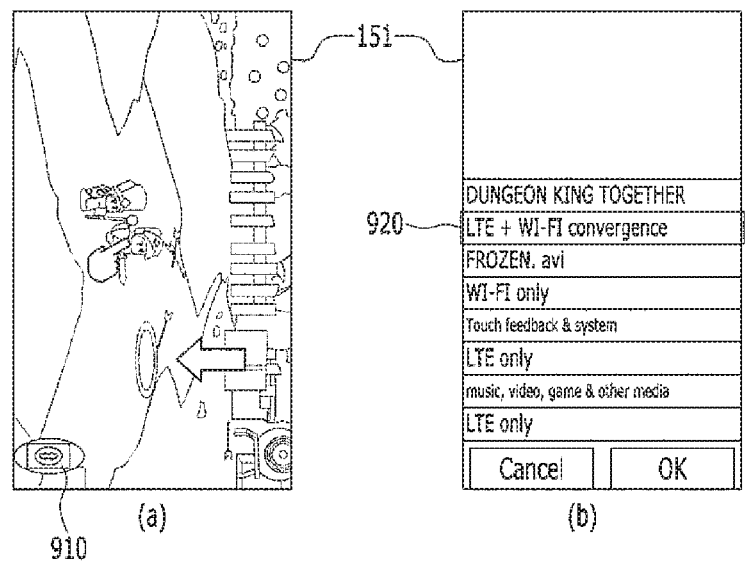
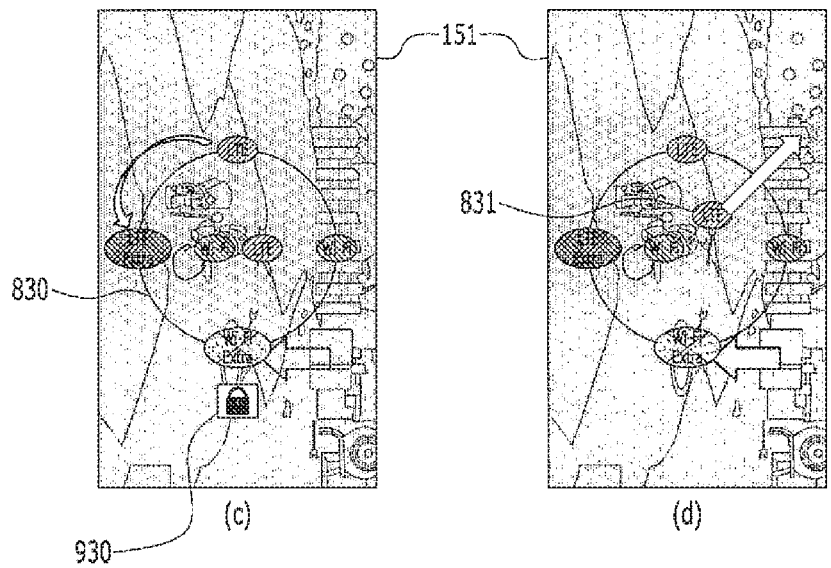

FIG. 15
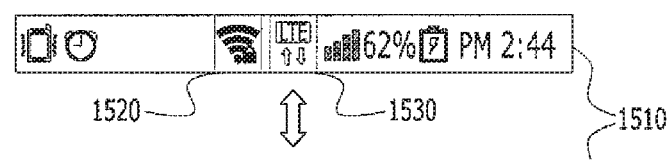
(a)
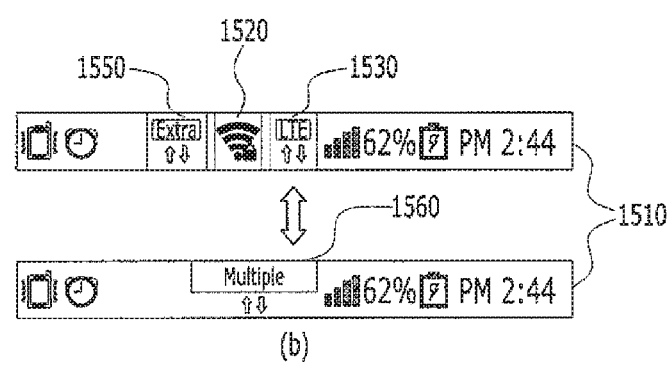
(b)

MOBILE TERMINAL AND METHOD FOR CONTROLLING SAME

CROSS-REFERENCE TO RELATED APPLICATIONS

This application is the National Stage filing under 35 U.S.C. 371 of International Application No. PCT/KR2015/003365, filed on Apr. 3, 2015, which claims the benefit of earlier filing date and right of priority to Korean Application No. 10-2014-0101833, filed on Aug. 7, 2014, the contents of which are all hereby incorporated by reference herein in their entirety.

TECHNICAL FIELD

The present invention relates to a mobile terminal, and more particularly, to a mobile terminal and controlling method thereof, suitable for enabling data exchange using wireless networks according to different network addresses simultaneously.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

As terminals have become increasingly more functional, they are configured as multimedia players including functionality which supports images or video capturing, music or video file playing, game playing, broadcast receiving and the like for example.

Efforts are ongoing to support and increase the functionality of terminals. Such efforts include software and hardware improvements, as well as changes and improvements in the structural components.

Recently, as a mobile terminal of a smartphone type is released and its performance is improved, since usages of the mobile terminal are further diversified, it becomes necessary to improve a wireless communication sped of the mobile terminal. As one of methods for this, it may consider a method of using different communication systems simultaneously or a method of using a plurality of packet data networks (PDNs) simultaneously in a manner of receiving assignment of a plurality of different network addresses.

Such multi-network simultaneous transmission/reception (i.e., network convergence) systems may include IFOM, ePDG, multiple and the like. When such a technology applies to a mobile terminal, the demand for a user interface capable of selecting a plurality of networks or releasing a state of multi-network simultaneous transmission/reception (i.e., network convergence) more efficiently is rising.

DISCLOSURE OF THE INVENTION

Technical Task

The technical task of the present invention is to provide a mobile terminal and controlling method thereof, which enables a user to control a multi-network simultaneous transmission/reception system.

Particularly, one technical task of the present invention is to provide a mobile terminal and controlling method thereof, by which a combination of networks to be used for data communication or a selective release of combined networks is further facilitated.

Another technical task of the present invention is to provide a mobile terminal and controlling method thereof, by which a multi-network simultaneous transmission/reception system can be controlled in consideration of a situation of a user or mobile terminal.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a mobile terminal, including a wireless communication unit configured to perform data exchange simultaneously through a plurality of different network addresses, a touchscreen, and a controller configured to display a plurality of display objects corresponding to different network addresses on the touchscreen, wherein if two or more of a plurality of the display objects are selected, the controller controlling the wireless communication unit to exchange data using networks according to network addresses corresponding to the selected display objects.

In another technical aspect of the present invention, provided herein is a method of controlling a mobile terminal, including displaying a plurality of display objects corresponding to different network addresses on a touchscreen, selecting two or more of a plurality of the display objects, and exchanging data using networks according to network addresses corresponding to the selected display objects.

Advantageous Effects

According to the present invention, a user can conveniently control multi-network simultaneous transmission/reception (i.e., network convergence).

Particularly, according to the present invention, a user can combine networks to use for data communication more conveniently or release the combined networks selectively, using display objects corresponding to different network addresses, respectively.

Moreover, according to the present invention, a user can receive a recommendation of a network according to a situation or recognize a change of situation.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 8 is a diagram to illustrate one example of a method of selecting a network through a circular user interface in a mobile terminal according to one embodiment of the present invention.

FIG. 9 is a diagram to illustrate one example of a method of selecting a network through a circular user interface in a mobile terminal according to one embodiment of the present invention.

FIG. 15 is a diagram to illustrate one example of a form of configuring or releasing a network by manipulating network indicators displayed on an indicator region in a drag manner in a mobile terminal according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1:
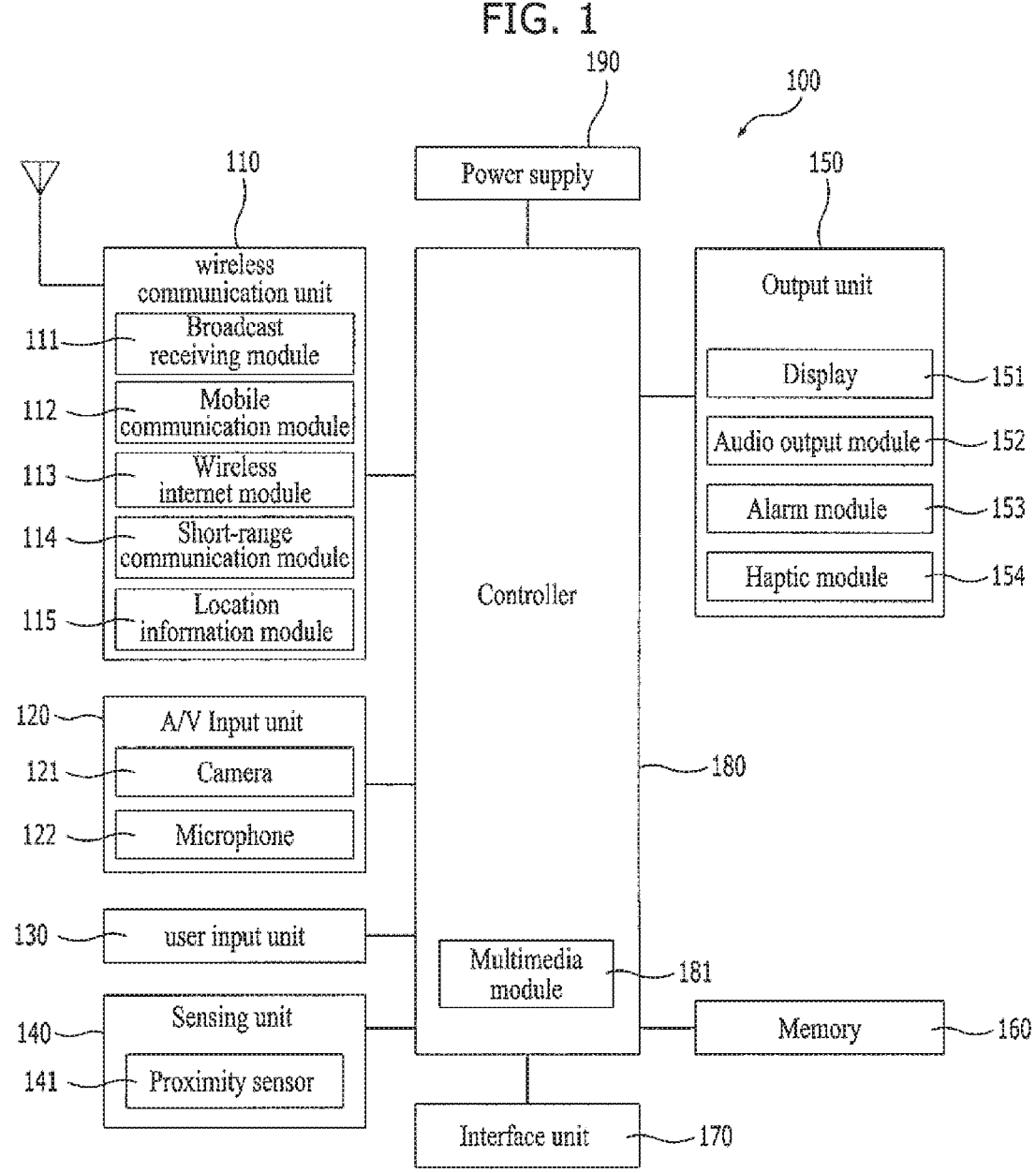
FIG. 1 is a block diagram of a mobile terminal in accordance with the present disclosure.
Figure 2A:
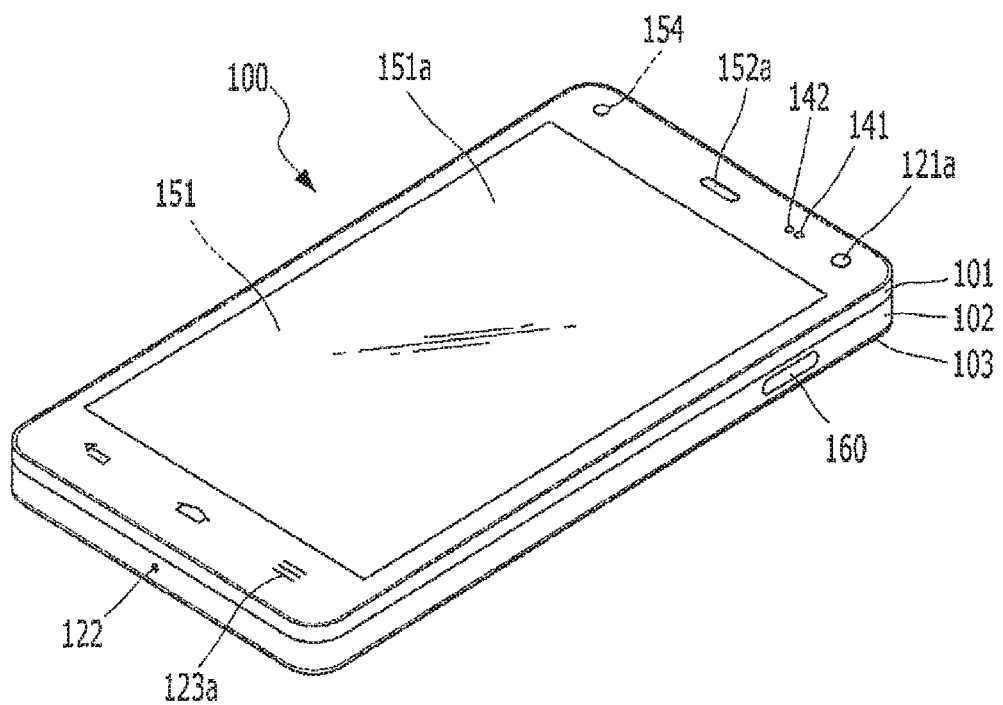
FIGS. 2A and 2B are conceptual views of one example of the mobile terminal, viewed from different directions, in accordance with the present disclosure.
Figure 2B:
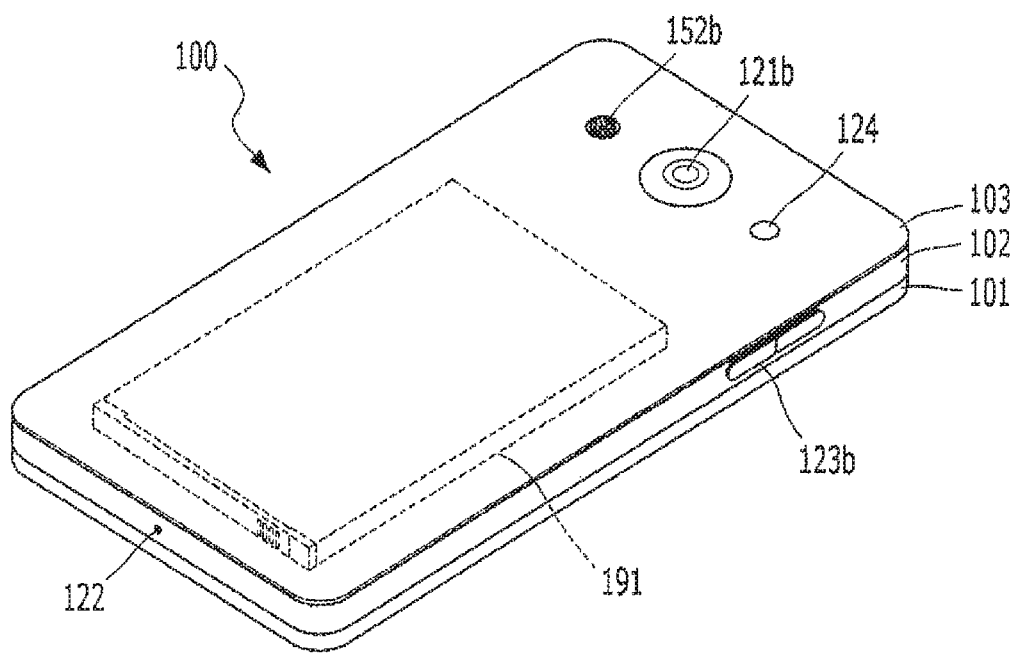

FIG. 1 is a block diagram of a mobile terminal in accordance with the present disclosure. FIGS. 2A and 2B are conceptual views of one example of the mobile terminal, viewed from different directions, in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented.

Particularly, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more of a broadcast receiving module 111, a mobile communication module 112, a wireless Internet module 113, a short-range communication module 114, and a location information module 115.

The input unit 120 includes a camera (or video input unit) 121 for obtaining images or video, a microphone (or audio input unit) 122, which is one type of audio input device for inputting an audio signal, and a user input unit 123 (for example, a touch key, a push key, a mechanical key, and the like) for allowing a user to input information. Data (for example, audio, video, image, and the like) is obtained by the input unit 120 and may be analyzed and processed into user's control commands.

The sensing unit 140 is typically implemented using one or more sensors configured to sense at least one of surrounding environment information of the mobile terminal and user information. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output unit 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed on the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted above, or activating application programs stored in the memory 170.

And, the controller 180 typically controls some or all of the components illustrated in FIG. 1 according to the execution of an application program that have been stored in the memory 170. Moreover, the controller 180 may combine to activate at least two of the components included in the mobile terminal 100 to launch the application program.

The power supply unit 190 is typically configured to receive external power or provide internal power in order to supply appropriate power required for operating elements and components included in the mobile terminal 100 under the control of the controller 180. The power supply unit 190 may include a battery, and the battery may be configured to be embedded in the terminal body, or configured to be detachable from the terminal body.

At least some of the respective components may cooperatively operate to implement operations, controls or controlling methods of a mobile terminal according to various embodiments described in the following. And, the operations, controls or controlling methods of the mobile terminal are typically implemented on the mobile terminal by launching at least one or more application programs stored in the memory 170.

The above-listed components are described in detail with reference to FIG. 1A before looking into various embodiments implemented through the above-described mobile terminal 100.

First of all, regarding the wireless communication unit 110, the broadcast receiving module 111 is typically configured to receive a broadcast signal and/or broadcast associated information from an external broadcast managing entity (or sever) via a broadcast channel. The broadcast channel may include a satellite channel, a terrestrial channel, or both. In some embodiments, two or more broadcast receiving modules may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, Digital Video Broadcast (DVB), Advanced Television Systems Committee (ATSC), etc.) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be saved to the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of the wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi) Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE, and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

In some embodiments, another mobile terminal (which may be configured similarly to mobile terminal 100) may be a wearable device, for example, a smartwatch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or a current position) of the mobile terminal. As an example, the location information module 115 includes a Global Position System (GPS) module, a Wi-Fi (Wireless Fidelity) module, or both. As one example, when the mobile terminal uses the GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

Next, the input unit 120 is described in detail as follows. The input unit 120 may be configured to permit various types of input (e.g., information, signal, etc.) to the mobile terminal 120. Examples of such input include audio, image, video, data, and user input. Image and video input is often obtained using one or more cameras 121. Such cameras 121 may process image frames of still pictures or video obtained by image sensors in a video call or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function (or application program) being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like and generate a corresponding sensing signal. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141 has durability and utilization better than those of a contact type sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (or, touch sensor) may also be categorized as a proximity sensor.

For clarity of the description, the term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signal(s) may be transmitted to a touch controller. The touch controller may process the received signal(s), and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor mentioned in the foregoing description may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

Besides, a hole sensor may be provided. The hole sensor is a sensor configured to sense a change of a magnetic field, and particularly, a presence or non-presence of approach of a magnet. Hence, in case that a magnet is provided to a cover mentioned later, the controller 180 can determine a presence or non-presence of proximity of the cover, i.e., an open or closed state of the cover through the hole sensor.

Meanwhile, the camera 121 described as a component of the input unit 120 is a sort of a camera sensor, and such a camera sensor typically includes at least one of the camera 121, a photo sensor, and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object, whereby position information of the physical object can be obtained.

The display unit 151 is generally configured to display (or, output) information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output unit 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output unit 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various informations for authenticating authority to use the mobile terminal 100, and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

As mentioned in the foregoing description, the controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100, under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

Discussion herein will often relate to a particular type of mobile terminal. However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102 and 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output units 152a and 152b, a proximity sensor 141, an illumination sensor 142, an optical output unit 154, first and second cameras 121a and 121b, first and second manipulation units 123a and 123b, a microphone 122, an interface unit 160 and the like.

In the following description, as shown in FIG. 2A and FIG. 2B, the display unit 151, the first audio output unit 152a, the proximity sensor 141, the illumination sensor 142, the optical output unit 154, the first camera 121a and the first manipulation unit 123 are disposed on a front side of a terminal body, the second manipulation unit 123b, the microphone 122 and the interface unit 160 are disposed on a lateral side of the terminal body, and the second audio output unit 152b and the second camera 121b are disposed on a rear side of the terminal body, for example.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the lateral side of the terminal body.

The display unit 151 displays (outputs) information processed in the mobile terminal 100. For example, the display unit 151 can display running screen information of an application program run in the mobile terminal 100 or UI/GUI (user interface/graphic user interface) information according to the running screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display (not shown) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output unit 152a may be implemented in the form of a receiver to deliver a call sound to user's ear, and the second audio output unit 152b may be implemented in the form of a loud speaker to output various alarm sounds or multimedia play sound.

The window 151a of the display unit 151 will typically include an aperture to permit audio generated by the first audio output unit 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output unit 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

The present drawing illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output units 152a or 152b, to switch to a touch recognition mode of the display unit 151, or the like.

As another example of the user input unit 123, a rear input unit 123c and 123d may be located on the rear surface of the terminal body. The rear input unit 123c and 123d can be manipulated by a user to provide input to the mobile terminal 100. The input may be used in a variety of different ways. For example, the rear input unit may be used by the user to provide an input for power on/off, start, end, scroll, control volume level being output from the first or second audio output units 152a or 152b, switch to a touch recognition mode of the display unit 151, and the like. The rear input unit 123c and 123d may be configured to permit a touch input, a push input, or combinations thereof.

The rear input unit 123c and 123d may be located to overlap the display unit 151 of the front side in a thickness direction of the terminal body. As one example, the rear input unit 123c and 123d may be located on an upper end portion of the rear side of the terminal body such that a user can easily manipulate it using a forefinger when the user grabs the terminal body with one hand. Particularly, the rear input unit 123c and 123d is characterized in being disposed adjacent to the rear camera 121b.

Embodiments that include the rear input unit 123c and 123d may implement some or all of the functionality of the first manipulation unit 123a in the rear input unit 123c and 123d, whereby a user interface of a new type can be implemented using the rear input unit 123c and 123d. As such, in situations where the first manipulation unit 123a is omitted from the front side, the display unit 151 can have a larger screen.

Meanwhile, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be additionally located on the terminal body. The second audio output module 152b may implement stereophonic sound functions in conjunction with the first audio output unit 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see to FIG. 1) may be retractable into the terminal body. Alternatively, an antenna may be formed using a film attached to an inner surface of the rear cover 103, or a case that includes a conductive material.

A power supply unit 190 (see to FIG. 1) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

In the present drawing, the rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can be also provided on the mobile terminal 100. One example of an accessory is a touch pen for assisting or extending a touch input to a touch screen. The touch pen may be provided in a manner of being received in the body of the mobile terminal, and may be implemented in a manner that whether the touch pen is withdrawn can be delivered to the controller 180 using a withdrawal sensor configured to sense whether the touch pen is received/withdrawn.

As another example of the accessory, a cover or pouch for covering or accommodating at least one surface of the mobile terminal 100 may be provided. The cover or pouch may cooperate with the display unit 151 to extend the function of the mobile terminal 100.

For clarity and convenience of the following description, assume that a mobile terminal mentioned in the following description includes at least one of the components shown in FIG. 1. Moreover, a graphic shape such as an arrow or a finger for indicating a specific object or selecting a menu on the display unit 151 is generally named a pointer or a cursor. Yet, the pointer may be interchangeably used to mean a finger, a stylus pen or the like for a touch manipulation or the like. Hence, in order to distinguish a pointer and a cursor from each other, a graphic displayed on the display unit 151 shall be named a cursor, while such a physical means for performing a touch, a proximity touch, a gesture or the like as a finger or a stylus pen shall be named a pointer.

User Interface for Multi-Network Simultaneous Transmission/Reception Control

First of all, the concept of multi-network simultaneous transmission/reception applicable to embodiments of the present invention and basic assumptions applicable to a mobile terminal for the same are described as follows.

A mobile terminal according to the present invention can simultaneously support independent networks (e.g., wi-fi/ePDG/3gpp multiple PDN) respectively having individual network paths, and an independent network address (e.g., IP address) is assigned per network path. Herein, the network path may inclusively mean a virtual path failing to be classified physically. Of course, if communication systems are different from each other, they generally have different networks, respectively. Yet, in some cases, the same communication system may have a plurality of different networks. For instance, in case of LTE multiple packets data network (PDN) system (hereinafter named 'LTE extra' or 'LTE Boosting' for clarity), a communication system uses LTE protocol but different network addresses may be assigned from a plurality of PDNs. Hence, a single mobile terminal can be recognized, by a server stage (i.e., a service providing stage), as different devices amounting to the number of individual network paths.

Figure 3:
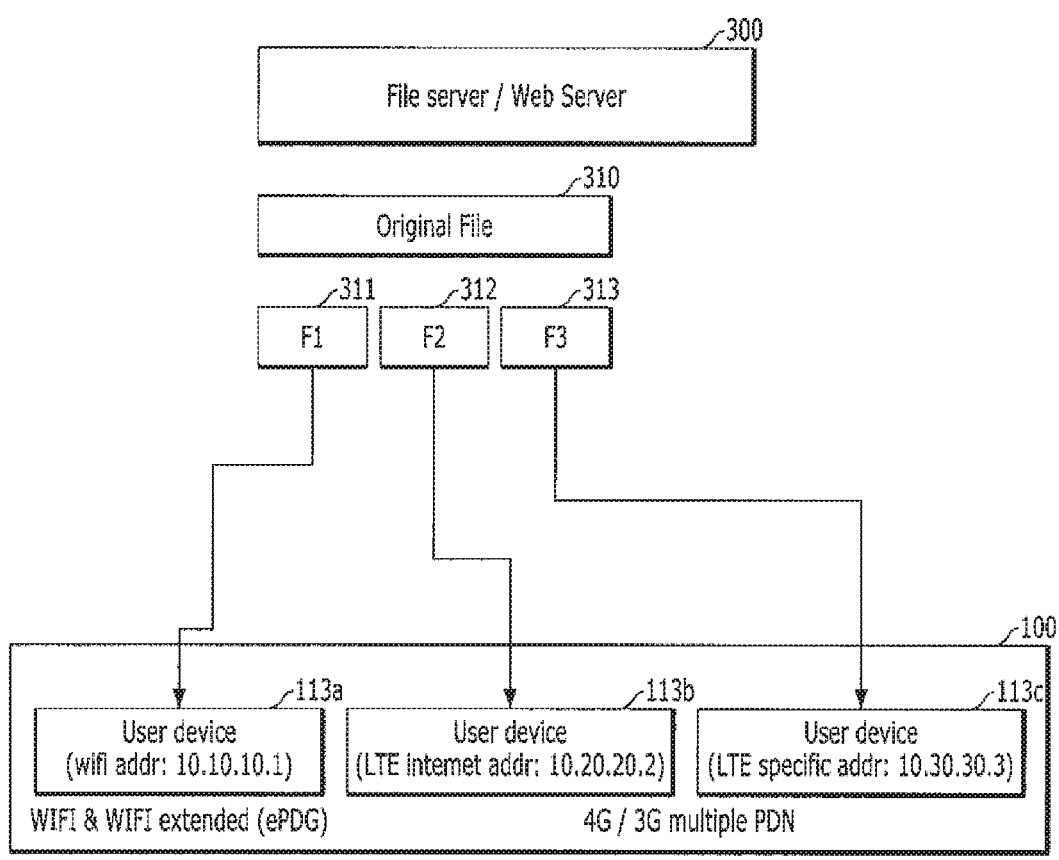
FIG. 3 is a diagram to illustrate one example of a process for transmitting data to a mobile terminal from a server in implementing a multi-network simultaneous transmission/reception system applicable to the present invention.

FIG. 3 is a diagram to illustrate one example of a process for transmitting data to a mobile terminal from a server in implementing a multi-network simultaneous transmission/reception system applicable to the present invention.

Referring to FIG. 3, a server 300 prepares an original file 310 downloadable to a mobile terminal 100 and files 311 to 313 created from partitioning the original file into pieces. If the mobile requests a file using a single network, the server sends the original file 310. If the mobile terminal requests the file by a multi-network simultaneous transmission/reception system, the server sends the partitioned files per network address. For instance, the first partitioned file 311 may be sent to a wi-fi address 113*a* from the mobile terminal 100, and the second and third partitioned files 312 and 313 may be set to different LTE addresses 113*b* and 113*c*, respectively. If the mobile terminal 100 receives the three partitioned files completely, it is able to reconstruct the same as the original file by combining the received files into one.

Namely, a server stage partitions service data and a mobile terminal then requests the partitioned data separately for each network. Thus, a single mobile terminal is enabled to use several networks simultaneously. Through this, a service speed can be remarkably improved. On the contrary, a mobile terminal partitions data to upload, notifies it to a server stage, and is then able to upload the partitioned data through independent networks different from each other, for example (not shown).

Of course, a mobile terminal according to the present invention may use a different network per type of data required for a single service (e.g., wi-fi for streaming contents of a webpage, LTE for images and texts, Wi-fi for video, LTE for audio, etc.) as well as the aforementioned file partition scheme, or may use a different network per service or application in a multitasking environment.

According to one embodiment of the present invention, a plurality of display objects respectively corresponding to different network addresses are displayed. If two or more of the display objects are selected, it is proposed to perform a data exchange suing networks according to the addresses corresponding to the selected display objects simultaneously. This is described with reference to FIG. 4.

Figure 4:
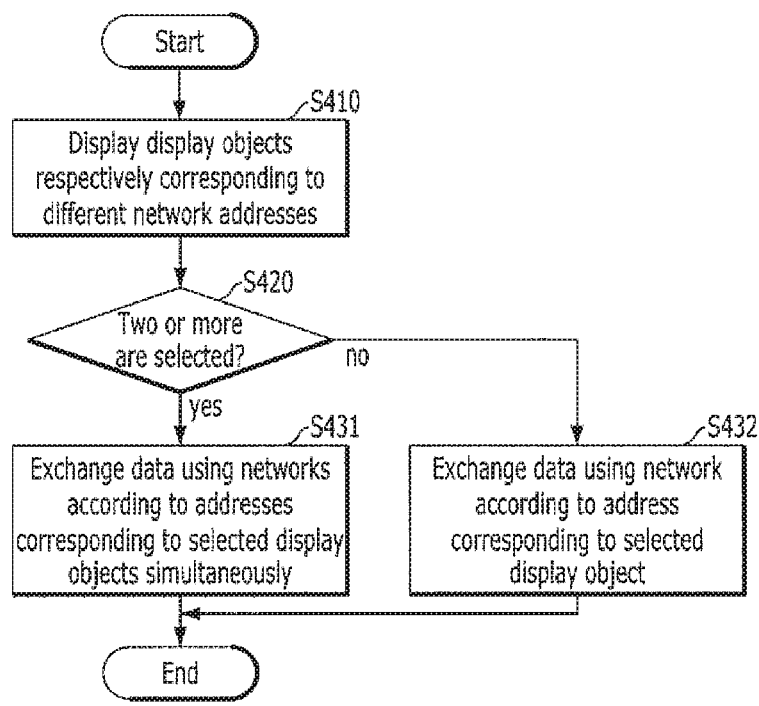
FIG. 4 is a diagram to illustrate one example of a process for performing a data exchange by selecting a network combination for multi-network simultaneous transmission/reception in a mobile terminal according to one embodiment of the present invention.

FIG. 4 is a diagram to illustrate one example of a process for performing a data exchange by selecting a network combination for multi-network simultaneous transmission/reception in a mobile terminal according to one embodiment of the present invention.

Referring to FIG. 4, first of all, the controller 180 may control display objects, which correspond to different network addresses, respectively, to be displayed on the touchscreen 151 [S410].

For one example of such a display object, there is an icon or indicator. In case of having a shape of the indicator, the display object may be displayed on an indicator region provided to a top end of the touchscreen 151 to indicate an operating state of the mobile terminal. If the display object is displayed on the indicator region, it can be displayed almost always on the indicator region except a case that an application is running as a full screen. On the other hand, in case of having a shape of the icon, the display object may be displayed based on an event (e.g., manipulating/calling a prescribed menu, running an application requiring a data exchange, turning a page, initiating a content download, etc.). Moreover, the controller 180 determines availability of each network address, communication quality and the like in advance before displaying a display object and then gives a visual effect corresponding to a result of the determination to the display object, or may control some display objects not to be displayed in some cases.

In doing so, if two or more display objects are selected [S420], the controller 180 may control the wireless communication unit 110 to perform a data exchange using networks according to addresses of the selected display objects simultaneously [S431].

If a single display object is selected, the controller 180 may control the wireless communication unit 110 to perform a data exchange suing a network according to an address corresponding to the selected display object [S432].

One example of a method of setting a multi-network simultaneous transmission/reception system through a setting menu according to the present invention is described with reference to FIGS. 5 to 7 as follows.

Figure 5:
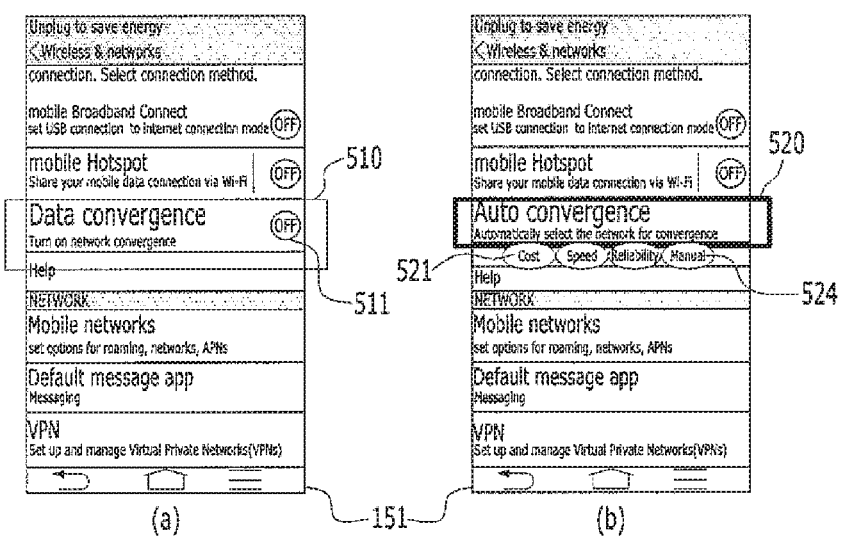
FIG. 5 is a diagram to illustrate one example of a process for selecting a multi-network simultaneous transmission/reception system through a setting menu in a mobile terminal according to one embodiment of the present invention.

FIG. 5 is a diagram to illustrate one example of a process for selecting a multi-network simultaneous transmission/reception system through a setting menu in a mobile terminal according to one embodiment of the present invention.

Referring to FIG. 5(*a*), a data convergence menu 510 may be provided to a wireless & networks item of an environment setting menu of a mobile terminal. Of course, it is apparent to those skilled in the art that a location and name of the menu are exemplary and changeable variously. Herein, if a toggle button 511 indicating an off state is selected through a touch input, as shown in FIG. 5(*b*), an auto convergence menu 520 is activated, whereby submenus 521 to 523 for giving a priority to a prescribed condition and a submenu 524 for switching to a manual selection can be displayed to be selected. Of course, before such a screen shown in FIG. 5(*b*) is displayed, a menu (not shown) for receiving a confirmation of an automatic setting or a manual setting from a user may be displayed. In doing so, the switching submenu 524 may not be displayed.

Figure 6:
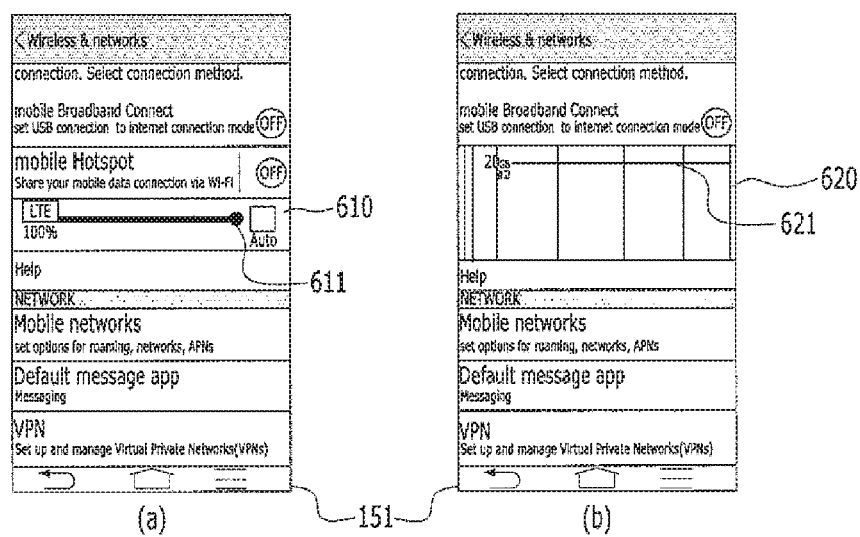
FIG. 6 is a diagram to illustrate one example of a form of automatically setting a multi-network simultaneous transmission/reception system by prioritizing a cost in a mobile terminal according to one embodiment of the present invention.

FIG. 6 is a diagram to illustrate one example of a form of automatically setting a multi-network simultaneous transmission/reception system by prioritizing a cost in a mobile terminal according to one embodiment of the present invention.

Referring to FIG. 6(*a*), if the cost submenu 521 is selected in the situation shown in FIG. 5(*b*), a menu 610 for selecting a use rate of a pay network can be displayed. Herein, the use rate of the corresponding network may be determined in a manner of moving a slider 611.

On the other hand, referring to FIG. 6(*b*), a menu 620 for limiting a maximum use amount of the pay network may be displayed. Herein, a maximum allowable data size of the corresponding network may be determined in a manner of moving an upper limit line 621.

Besides, in case of auto settings, if a speed is prioritized, current speed information per network address may be displayed. If reliability is prioritized, information on a security level or successful reception rate may be displayed.

Meanwhile, use result information of such data convergence may be set to be provided. This is described with reference to FIG. 7.

Figure 7:
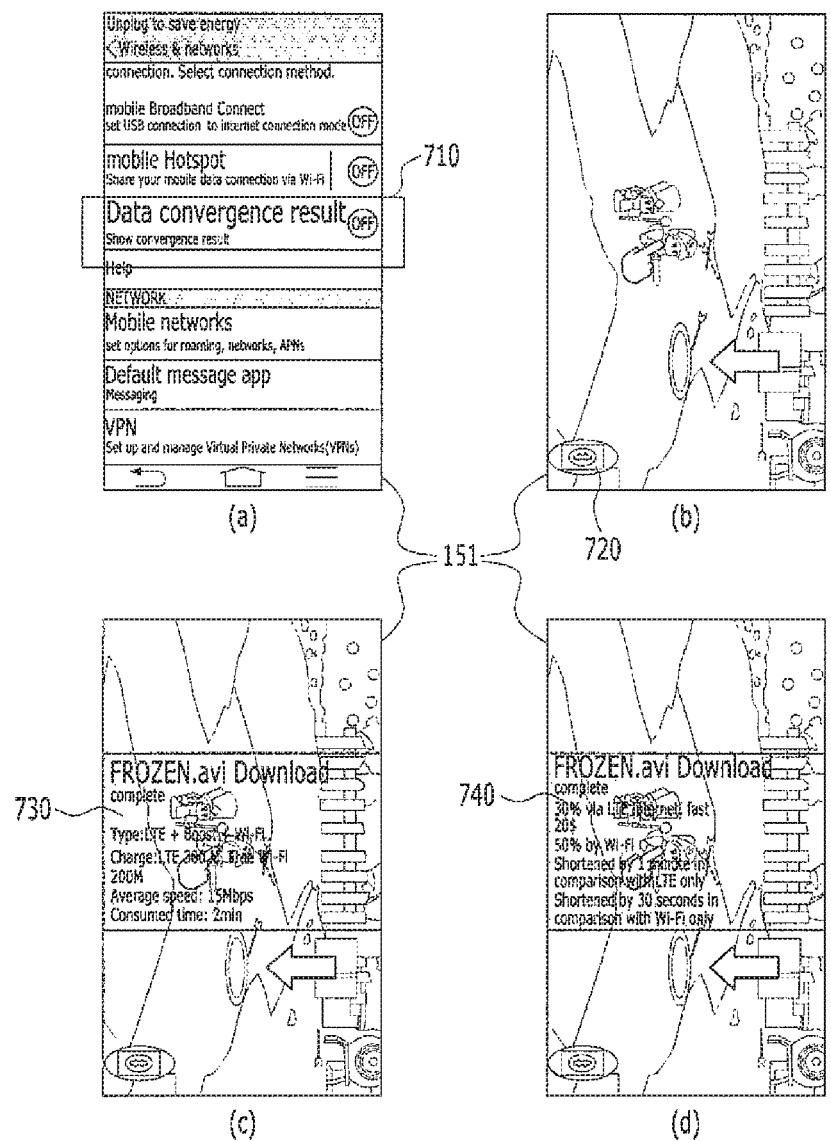
FIG. 7 is a diagram to illustrate one example of a form of setting and providing use result information of data convergence in a mobile terminal according to one embodiment of the present invention.

FIG. 7 is a diagram to illustrate one example of a form of setting and providing use result information of data convergence in a mobile terminal according to one embodiment of the present invention.

Referring to FIG. 7(*a*), it is able to set whether to display a result of data convergence through a prescribed menu 710 of environment settings. Thereafter, if the data convergence is activated and a data exchange is performed through it, as shown in FIG. 7(*b*), an icon 720 indicating that the data convergence is activated can be displayed. The corresponding icon 720 may be always displayed while the data convergence is activated. Alternatively, the corresponding icon 720 may be displayed in a multitasking environment only. If a download through the data convergence is completed in such a state, as shown in FIG. 7(*c*), information 730 on type, charge, speed, consumed time and the like of simultaneously used networks can be displayed. If the displayed information 730 is selected through a touch input or the like, as shown in FIG. 7 9*d*), additional information 740 may be further displayed.

A method of manually configuring networks to participate in data convergence according to one embodiment of the present invention is described as follows. According to the present invention, a method of manually configuring networks can be mainly classified into one of three methods: 1) a method of disposing display objects respectively corresponding to different network addresses on a circle and then enabling a user to move the object corresponding a configuration-desired network address into the circle; 2) a method of selecting a display object displayed on a notification panel by toggling or overlaying two or more objects with each other; and 3) a method of overlaying display objects displayed on an indicator region with each other.

First of all, a method of disposing display objects on a circular shape and then selecting the display object(s) is described with reference to FIGS. 8 to 10.

FIG. 8 is a diagram to illustrate one example of a method of selecting a network through a circular user interface in a mobile terminal according to one embodiment of the present invention.

Referring to FIG. 8(*a*), as simultaneous communications by Wi-Fi and LTE are enabled, the controller 180 may control indicators 811 and 813, which indicate that the communication systems are activated, respectively, to be displayed on an indicator region. In doing so, if a content download menu 820 is selected, as shown in FIG. 8(*b*), a circular user interface can be displayed. In particular, on the circular user interface, icons 831 to 834 respectively corresponding to different network addresses supportable through a mobile terminal are disposed along a circle 830. Herein, a different visual effect may be given to each of the icons according to a state. For instance, a color indicating 'free of charge' is given to the Wi-Fi icon 833 and 'x' is marked on the W-Fi extra icon 834 that is not supportable currently. Herein, 'Wi-Fi extra' is a common name of a Wi-Fi extended network such as ePDG, S2B, IFOM or the like in this disclosure.

In such a state, if a user drags the icon 833 into the circle 830, as shown in FIG. 8(*c*), information on a network corresponding to the icon may be displayed on a bottom end. Moreover, referring to FIG. 8(*d*), if the user additionally drags the icon 831 corresponding to another network address desired to participate in the convergence into the circle 830 and then rotates the circle 830 or the icons disposed along the circle 830 in a prescribed direction (e.g., clockwise), the corresponding selection can be completed. Hence, the controller 180 can perform the data exchange for a corresponding service using the networks according to the network addresses corresponding to the icons having moved into the circle together.

When the corresponding service does not support a corresponding service, if one icon is selected, the user interface may be ended while another icon is automatically released from selection.

FIG. 9 is a diagram to illustrate one example of a method of selecting a network through a circular user interface in a mobile terminal according to one embodiment of the present invention.

After a network to participate in data convergence has been configured by the method described with reference to FIG. 8, as shown in FIG. 9(a), an icon 910 indicating that the data convergence is activated for multitasking may be displayed. Herein, if the icon 910 is selected, as shown in FIG. 9(b), a list of data convergence using services can be displayed. Of course, if there is a single service that uses data convergence, the steps shown in FIG. 9(b) may be skipped. If a specific service 920 is selected from the list, as shown in FIG. 9(c), a circular user interface can be called in again. While the data convergence is in progress, an icon 930 indicating a lock state can be displayed. If the circular user interface is rotated in a direction (e.g., counterclockwise) opposite to the rotated direction in FIG. 8(d), the lock state can be released. Hence, as shown in FIG. 9(d), the user can release the data convergence by moving an icon 831' corresponding to the network currently participating in the data convergence away from the circle 830, or change the configuration of the data convergence by moving a new icon into the circle. Once the reconfiguration is complete, the user can reactivate the data convergence by rotating the circular user interface clockwise again.

Figure 10:
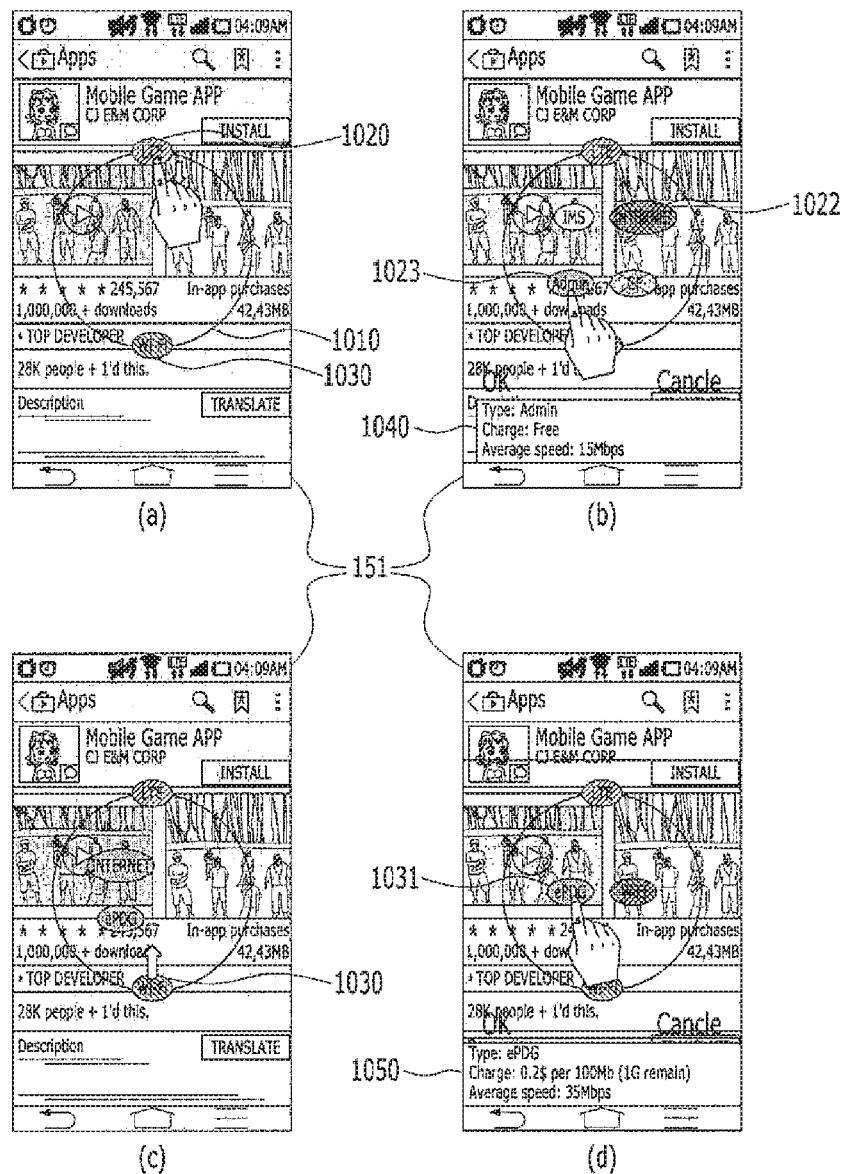
FIG. 10 is a diagram to illustrate another example of a method of selecting a network through a circular user interface in a mobile terminal according to one embodiment of the present invention.

FIG. 10 is a diagram to illustrate another example of a method of selecting a network through a circular user interface in a mobile terminal according to one embodiment of the present invention.

Referring to FIG. 10(a), icons 1020 and 1030 of communication protocol units (e.g., LTE, Wi-Fi) can be preferentially displayed on a circumference of a circle 1010 only. Herein, if the LTE icon 1020 is dragged into the circle 1010, as shown in FIG. 10(b), icons respectively corresponding to different network addresses using the LTE system can be displayed. Herein, a first visual effect (e.g., color, blinking, etc.) and a second visual effect may be given to an icon 1022 corresponding to default PDN and an icon 1023 corresponding to another selectable PDN, respectively. Moreover, although PDN exists, if a selection is impossible for a corresponding service, a third visual effect (e.g., mark 'x', etc.) may be given to the corresponding icon. Moreover, detailed information 1040 of a network corresponding to a selected icon may be displayed on a bottom end of a screen. Herein, after an INTERNET icon 1022 and an Admin icon 1023 have been selected, as shown in FIG. 10(c), if the Wi-Fi icon 1030 is dragged into the circle 1010, as shown in FIG. 10(d), icons respectively corresponding to detailed networks (e.g., normal Wi-Fi, extended W-Fi, etc.) can be displayed within the circle.

Meanwhile, the icon displaying method shown in FIG. 8 and the icon displaying method shown in FIG. 10 may be flexibly combined together. For instance, if the number of subordinate LTE multiple PDN/wi-fi extra tech items supportable within each communication protocol unit is smaller than a preset number, all subordinate items may be displayed along a circle. Otherwise, as shown in FIG. 10, the items may be displayed along a circle by protocol units. Moreover, if each subordinate item is displayed along a circle, a size of an icon can be adjusted according to the number of subordinate items.

A method of selecting display objects displayed on a notification panel by toggling and a method of overlaying two or more objects with each other are described with reference to FIGS. 11 to 14 as follows.

Figure 11:
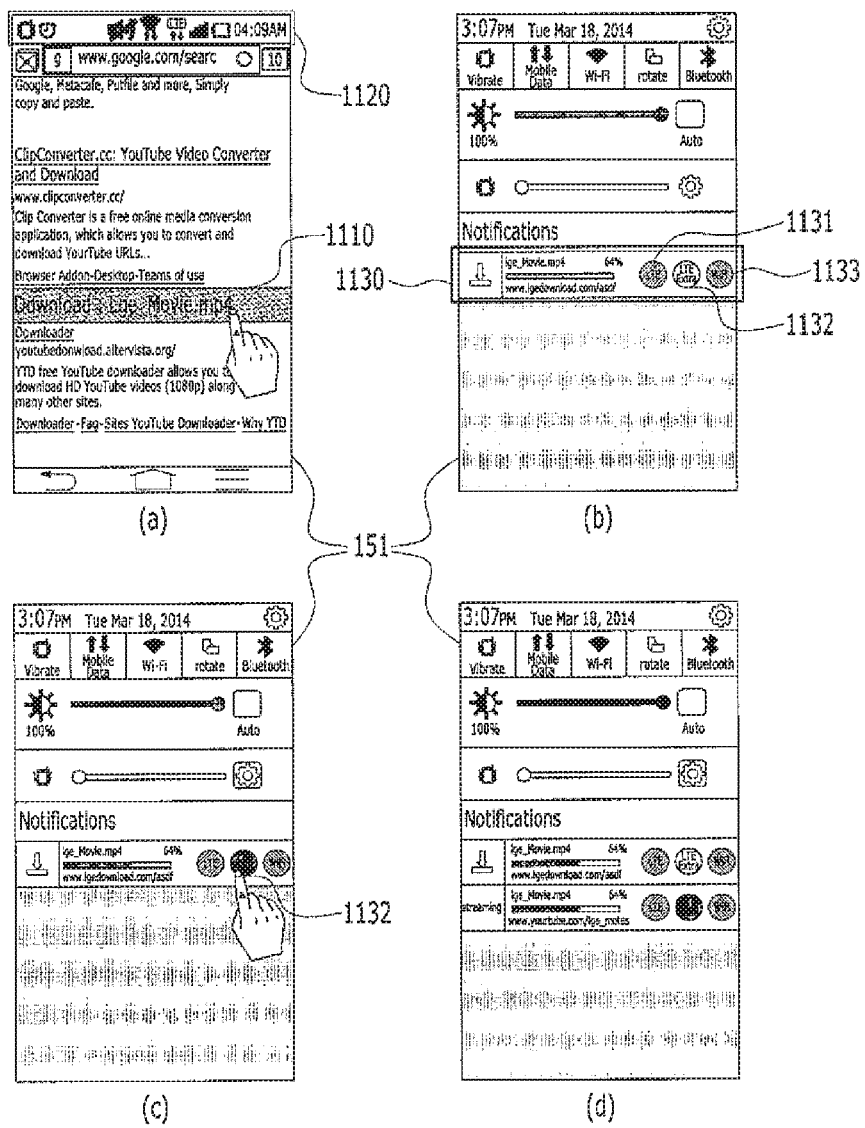
FIG. 11 is a diagram to illustrate one example of a form of configuring a network by manipulating display objects displayed on a notification panel in a toggling manner in a mobile terminal according to one embodiment of the present invention.

FIG. 11 is a diagram to illustrate one example of a form of configuring a network by manipulating display objects displayed on a notification panel in a toggling manner in a mobile terminal according to one embodiment of the present invention.

A user may download an application or content through various paths such as web, market and the like. For instance, as shown in FIG. 11(a), a download link 1110 can be selected from a webpage. Hence, as shown in FIG. 11(b), a download status of a content corresponding to the selected link can be displayed on a notification panel. Herein, the notification panel may be displayed in a manner that a user typically drags an indicator region 1120 displayed on a top end of a touchscreen in a bottom direction.

Referring to FIG. 11(b), a name of the downloaded content, a download progress, and a plurality of icons 1131 to 1133 may be displayed within a prescribed region 1130 of a middle end of the notification panel. Herein, the icons correspond to different network addresses, respectively. In the drawing, LTE icon 1131 and Wi-Fi icon 1133 are selected as defaults, which means that the corresponding content is being downloaded using both LTE and Wi-Fi simultaneously. In doing so, if the user selects LTE extra icon 1132, as shown in FIG. 11(c), the corresponding content can be simultaneously download through three different network addresses. Regarding the icons by toggling, if the activated icon is reselected, a download using the network address corresponding to the reselected icon is deactivated (i.e., the corresponding network is excluded from the data convergence).

Of course, as shown in FIG. 11(d), the configuration of networks participating in the data convergence may be set different per download content or by service units, upload/ streaming content units (not shown).

Figure 12:
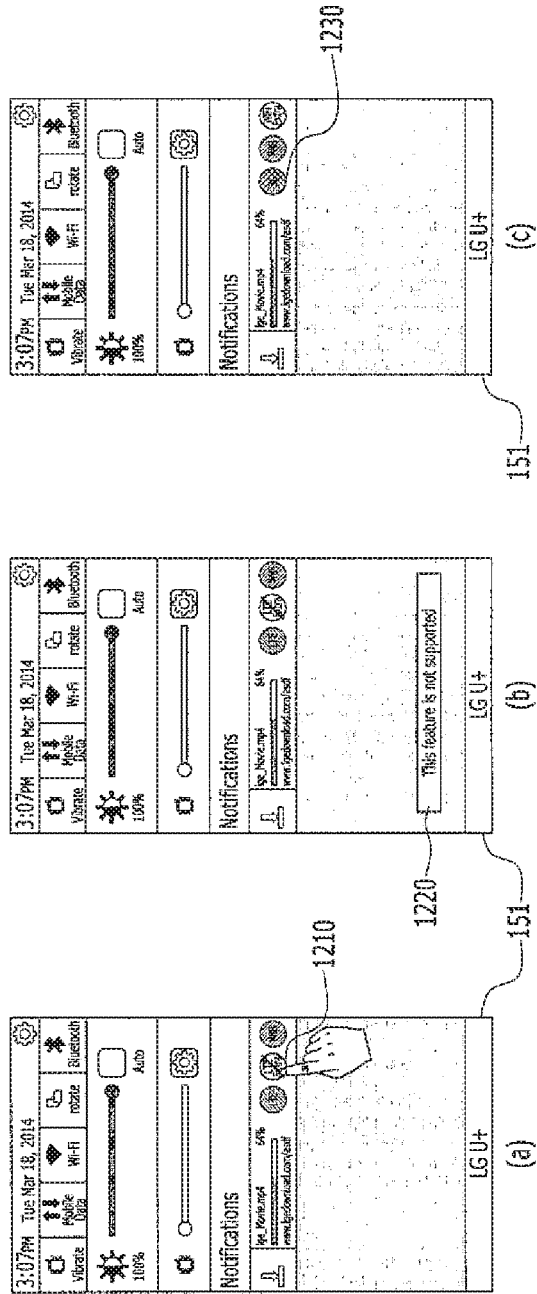
FIG. 12 is a diagram to illustrate another example of a form of configuring a network by manipulating display objects displayed on a notification panel in a toggling manner in a mobile terminal according to one embodiment of the present invention.

FIG. 12 is a diagram to illustrate another example of a form of configuring a network by manipulating display objects displayed on a notification panel in a toggling manner in a mobile terminal according to one embodiment of the present invention.

Referring to FIG. 12(a), a visual effect (herein, an oblique line) indicating 'unsupportable' may be given to an icon 1210 corresponding to a network unsupported by a corresponding service in content download information displayed on a notification panel. If a user selects the icon 1210, as shown in FIG. 12(b), a message 1220 indicating that the corresponding network is not supported may be outputted.

Meanwhile, in case that LTE network is not supported according to an area or a communication service provider, as shown in FIG. 12(c), an icon 1230 corresponding to another download supportable network (herein, 3G).

Figure 13:
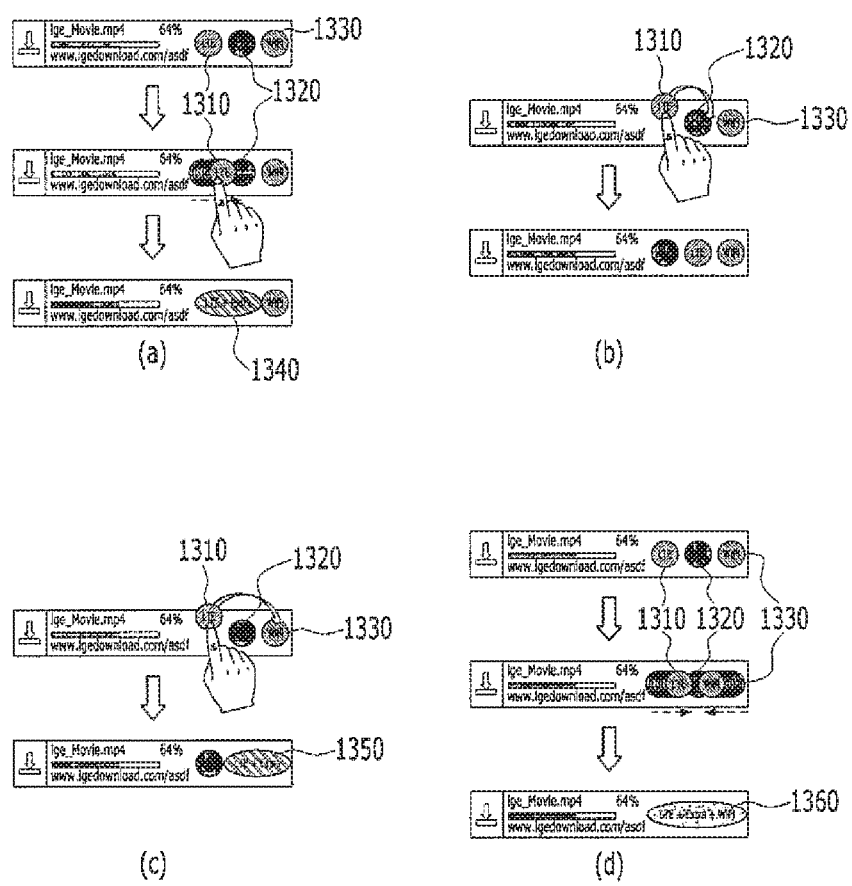
FIG. 13 is a diagram to illustrate one example of a form of configuring a network by manipulating display objects displayed on a notification panel in a drag manner in a mobile terminal according to one embodiment of the present invention.
Figure 14:
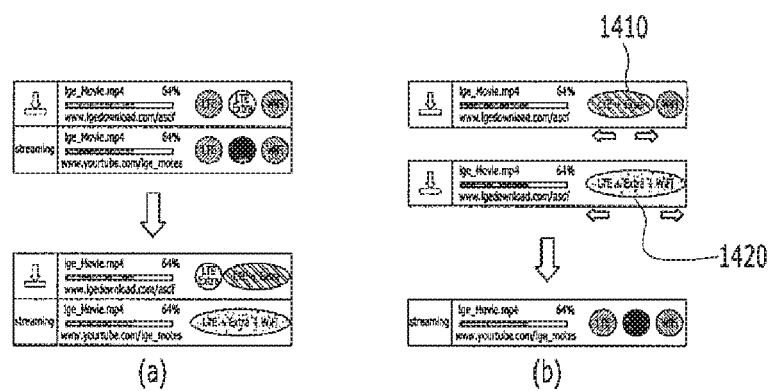
FIG. 14 is a diagram to illustrate one example of a form of configuring or releasing a network by manipulating display objects displayed on a notification panel in a drag manner in a mobile terminal according to one embodiment of the present invention.

A method of configuring or releasing data convergence through a drag & drop touch input of display objects displayed on a notification panel is described with reference to FIG. 13 and FIG. 14 as follows. In FIG. 13 and FIG. 14, for clarity of the description, the notification panel is not shown but download content information displayed thereon is illustrated only.

FIG. 13 is a diagram to illustrate one example of a form of configuring a network by manipulating display objects displayed on a notification panel in a drag manner in a mobile terminal according to one embodiment of the present invention.

Referring to FIG. 13(a), icons 1310, 1320 and 1330 respectively corresponding to networks capable of configuring data convergence applicable to a download of a content are displayed. Herein, if the LTE icon 1310 is dragged & dropped on the LTE extra icon 1320, an LTE+

Extra icon 1340 is created so that a corresponding content can be downloaded using different LTE PDNs together. Of course, as shown in FIG. 13(*b*), the drag & drop command may be usable to change the placement order of the icons.

Moreover, referring to FIG. 13(*c*), by dragging & dropping one icon 1310 to another icon 1330 not adjacent thereto, a network to participate in the data convergence can be selected. Hence, an LTE+Wi-Fi icon 1350 is created so that the corresponding content can be downloaded using both LTE and Wi-Fi.

Referring to FIG. 13(*d*), if two icons 1310 and 1330 are simultaneously dragged to the remaining icon 1320 through a multi-touch, an LTE+Extra+Wi-Fi icon 1360 is created, whereby all the networks respectively corresponding to the three icons can be simultaneously used to download the corresponding content.

In a manner similar to that shown in FIG. 13(*d*), if two icons 1310 and 1330 meet each other by being simultaneously dragged through a multi-touch, all the networks respectively corresponding to the two icons 1310 and 1330 and the rest of the icon 1320 displayed between the two icons may be simultaneously used to download the corresponding content.

If a touch input is applied to the icon 1340/1350/1360 indicating a data convergence status, the convergence status is released and the icons can return to a status before the data convergence. Meanwhile, if the convergence status is released, a controller may control service associated data to be exchanged through a single network set as default.

FIG. 14 is a diagram to illustrate one example of a form of configuring or releasing a network by manipulating display objects displayed on a notification panel in a drag manner in a mobile terminal according to one embodiment of the present invention.

Referring to FIG. 14(*a*), the method described with reference to FIG. 13 may be separately applicable to each service (i.e., a download content). Moreover, referring to FIG. 14(*b*), while icons 1410 and 1420 indicating a convergence status are touched with two different pointers, if the pointers are dragged in a pinch-out direction, the convergence status is released and the icons can return to a status before the data convergence. Meanwhile, if the convergence status is released, a controller may control service associated data to be exchanged through a single network set as default.

A method of configuring a network to participate in data convergence in a manner of overlaying display objects displayed on an indicator region with each other is described with reference to FIG. 15 as follows. In FIG. 15, an indicator region on a top end of a touchscreen is shown only.

FIG. 15 is a diagram to illustrate one example of a form of configuring or releasing a network by manipulating network indicators displayed on an indicator region in a drag manner in a mobile terminal according to one embodiment of the present invention.

Referring to FIG. 15(*a*), an indicator 1520 corresponding to a Wi-Fi network and an indicator 1530 corresponding to an LTE network are separately displayed on an indicator region 1510. Generally, in case of a connection to a Wi-Fi network, it may happen that an indicator corresponding to a 3G/4G network is not displayed. Yet, according to the present embodiment, when two indicators are simultaneously displayed, assume a case that general data and data corresponding to a specific type or application, which is set in advance by a communication service provider or a mobile terminal manufacturer, are exchanged through a Wi-Fi network and an LTE network, respectively.

Herein, if a user drags one indicator to another indicator or applies a drag & drop in a manner of decreasing a space between touch points while maintaining a multi-touch to indicators simultaneously, a data exchange can be performed using two networks together as soon as an LTE=Wi-Fi integrated indicator 1540 is displayed. As mentioned in the foregoing description, while an integrated indicator is simultaneously touched with two different pointers, if the pointers are dragged in a pinch-out direction, a convergence status is released and the indicators can return to a status before the data convergence.

Moreover, referring to FIG. 15(*b*), when an LTE extra indicator 1550 is additionally displayed, if both of the LTE extra indicator 1550 and the LTE indicator 1530 are dragged to the Wi-Fi indicator 1520, a multiple indicator 1560 is created and a data exchange can be performed using the three networks simultaneously. Of course, while the multiple indicator is simultaneously touched with two different pointers, if the pointers are dragged in a pinch-out direction, a convergence status is released and the indicators can return to a status before the data convergence.

In a manner similar to that shown in FIG. 15(*d*), if the two icons 1550 and 1530 meet each other by being simultaneously dragged through a multi-touch, all the networks respectively corresponding to the two icons 1550 and 1530 and the rest of the icon 1520 displayed between the two icons may be simultaneously used to download the corresponding content.

If a touch input is applied to the icon 1540/1560 indicating a data convergence status, the convergence status is released and the icons can return to a status before the data convergence. Meanwhile, if the convergence status is released, a controller may control service associated data to be exchanged through a single network set as default.

Meanwhile, as indicators corresponding to at least two network addresses are simultaneously displayed, although a data exchange is performed through the respective networks, when it is impossible to configure data convergence, if a user drags one or more indicators to another indicator, the dragged indicator may return to its previous place with a visual effect of bounce-off instead of creating an integrated indicator.

A recommended network providing function using a circular user interface is described with reference to FIG. 16 and FIG. 17 as follows.

Figure 16:
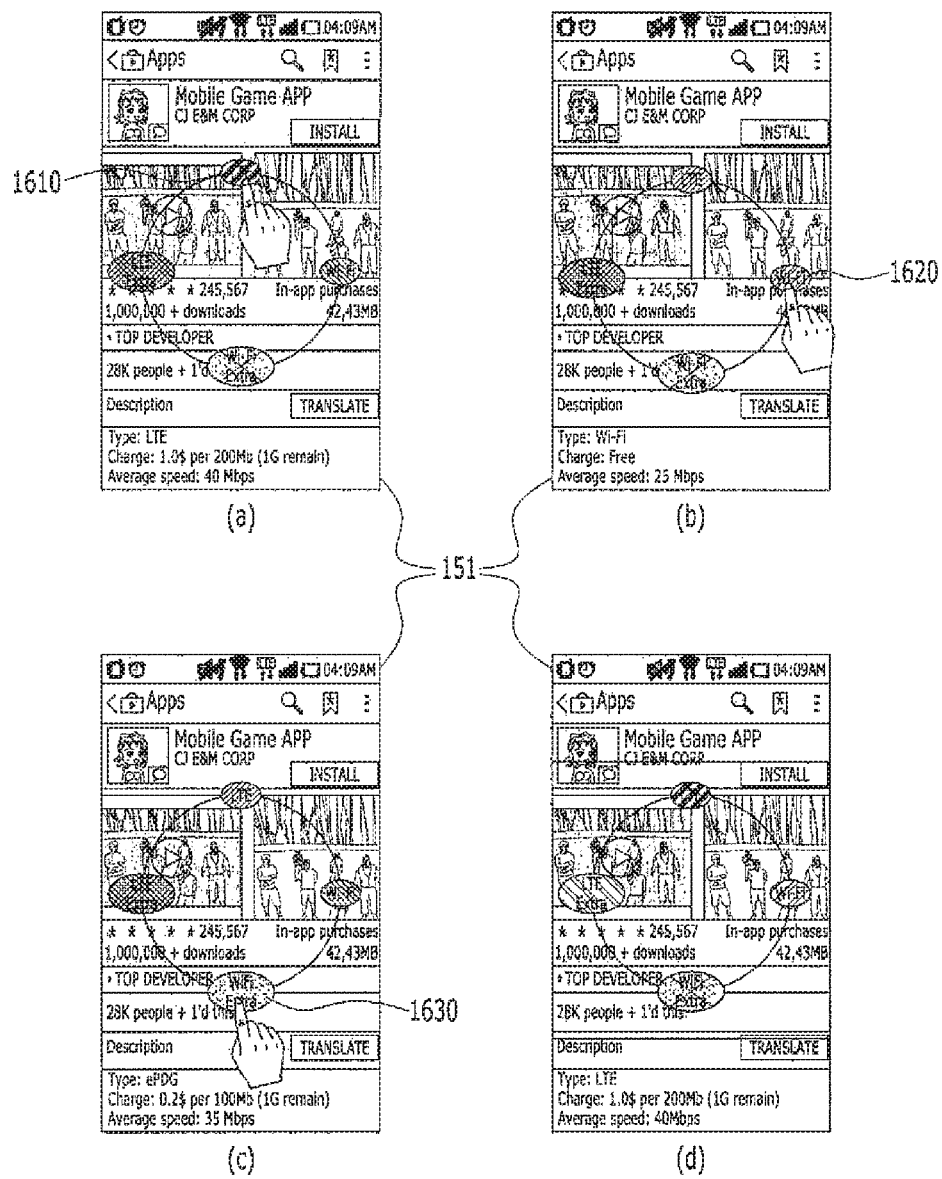
FIG. 16 is a diagram to illustrate one example of a form of performing a recommended network providing function using a circular user interface in a mobile terminal according to one embodiment of the present invention.

FIG. 16 is a diagram to illustrate one example of a form of performing a recommended network providing function using a circular user interface in a mobile terminal according to one embodiment of the present invention.

According to the present embodiment, when a circular user interface is displayed, the controller 180 of the mobile terminal can give a different visual effect to each icon in consideration of various references, e.g., speed, cost, reliability, etc.

Referring to FIG. 16(*a*), in case of a speed reference, a first visual effect may be given to an icon 1610 corresponding to a fastest network. And, detailed information (e.g., charge information, speed information, free data residual information, etc.) on the corresponding network may be displayed on a bottom end of a touchscreen. Moreover, referring to FIG. 16(*b*), in case of a cost reference, a second visual effect may be given to an icon 1620 corresponding to a free network. Referring to FIG. 16(*c*), in case of a reliability reference, a third visual effect may be given to an icon 1630 corresponding to a network having lowest traffic and highest sensitivity with charge. Of course, referring to FIG. 16(d), a visual effect according to each reference may be simultaneously displayed per icon.

Meanwhile, if a recommended network is changed depending on a network situation or configuration, the controller 180 may inform a user of such a change and recommend other networks. This is described with reference to FIG. 17.

Figure 17:
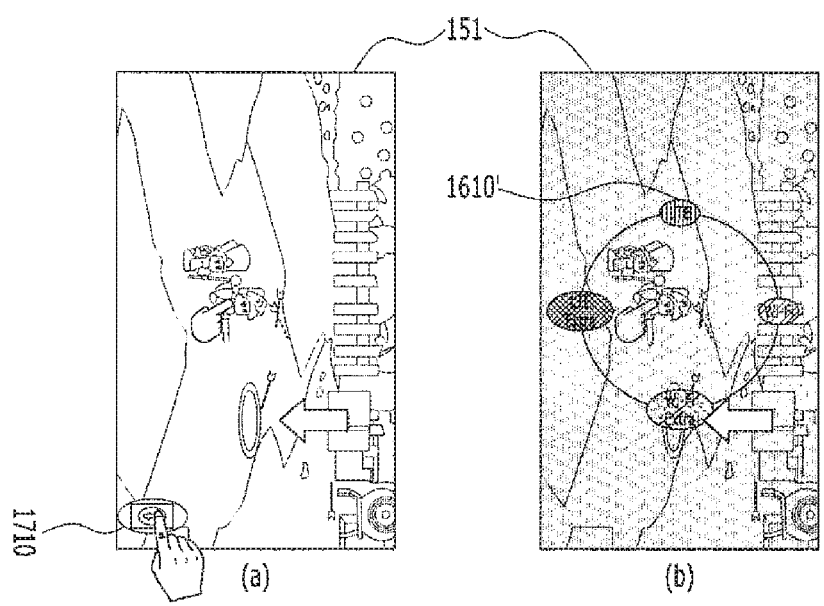
FIG. 17 is a diagram to illustrate another example of a form of performing a recommended network providing function using a circular user interface in a mobile terminal according to one embodiment of the present invention.

FIG. 17 is a diagram to illustrate another example of a form of performing a recommended network providing function using a circular user interface in a mobile terminal according to one embodiment of the present invention.

After a user has selected the LTE network having the highest speed in FIG. 16(a), if the speed of the LTE network is lowered in the course of multitasking, as shown in FIG. 17(a), an icon 1710 indicating the lowered network speed is displayed. Or, if a convergence icon continues to be displayed, another visual effect (e.g., flicking, etc.) may be given to the displayed icon. Hence, if the user selects the corresponding icon 1710, as shown in FIG. 17(b), a circular user interface can be displayed. In doing so, a first visual effect given to the icon 1610' corresponding to the LTE network may not be further displayed due to the degraded network quality. By referring to it, the user can change the network.

According to the aforementioned embodiments, a shape of a circular user interface is exemplary. And, it is a matter of course that the shape of the circular user interface can be substituted with figures other than a circle.

It will be apparent to those skilled in the art that various modifications and variations can be made in the present invention without departing from the spirit or scope of the inventions.

Various embodiments may be implemented using a computer-readable medium having instructions stored thereon for execution by a processor to perform various methods presented herein. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the computer-readable medium may be realized in the form of a carrier wave (for example, a transmission over the Internet). The computer may include the controller 180 of the terminal.

Therefore, the foregoing embodiments are merely exemplary and are not to be considered as limiting the present disclosure. Thus, it is intended that the present invention covers the modifications and variations of this invention provided they come within the scope of the appended claims and their equivalents.

INDUSTRIAL APPLICABILITY

The present invention is described by focusing on a mobile terminal, which is exemplary. And, the present invention is applicable to a fixed type terminal as well.

What is claimed is:

1. A mobile terminal, comprising:
    a wireless communication unit configured to perform data exchange using at least one of a plurality of communication systems corresponding to different network addresses;
    a touchscreen; and
    a controller configured to:
        cause the touchscreen to display a screen including a plurality of objects, each of the plurality of objects corresponding to a respective one of the plurality of the communication systems;
        cause the touchscreen to display, on the screen, a defined region for receiving a touch input initiated from at least one of the plurality of objects;
        recognize a touch input received on the touch screen for moving at least two of the plurality of objects into the defined region;
    control the wireless communication unit to exchange data by simultaneously using at least two different communication systems corresponding to the moved at least two objects in response to the touch input;
    when a first object of the plurality of objects is moved to a second object of the plurality of objects, control the wireless communication unit to exchange data by simultaneously using first and second communication systems corresponding to the first and second objects; and
    when the first and second communication systems are not usable simultaneously, cause the first object to return to a previous location, at which the first object was located prior to moving to the second object.

2. The mobile terminal of claim 1, wherein:
    the plurality of objects are disposed along a preset geometric plane shape; and
    the defined region is located within the preset geometric plane shape.

3. The mobile terminal of claim 2, wherein the controller is further configured to determine that the at least two objects are selected in response to a first pattern touch received at a periphery of the preset geometric plane shape after receiving the touch input.

4. The mobile terminal of claim 3, wherein when a second pattern touch is received at the periphery of the preset geometric plane shape and at least one of the selected at least two objects is moved away from the preset geometric plane shape, the controller is further configured to exclude a communication system corresponding to the moved-away object from the data exchange.

5. The mobile terminal of claim 1, wherein the plurality of objects are displayed either on a specific panel for displaying notification information for a service or on a specific region for displaying indicators indicating operating states of the mobile terminal.

6. The mobile terminal of claim 1, wherein when at least two of the plurality of objects are activated in response to toggling, the controller is further configured to:
    determine that the activated at least two objects are selected; and
    control the wireless communication unit to exchange data by simultaneously using at least two communication systems corresponding to the selected at least two objects.

7. The mobile terminal of claim 1, wherein the controller is further configured to cause the touchscreen to display a new object instead of the first and second objects.

8. The mobile terminal of claim 7, wherein in response to a multi-touch of a specific pattern received on the new object, the controller is further configured to cause the touchscreen to display the first and second objects again instead of the new object.

9. A method for controlling a mobile terminal, the method comprising:
    displaying a screen including a plurality of objects on a touchscreen, each of the plurality of objects corresponding to a respective one of a plurality of the communication systems corresponding to different network addresses;

displaying, on the screen, a defined region for receiving a touch input initiated from at least one of the plurality of objects;

receiving, via the touchscreen, a touch input for moving at least two of the plurality of objects into the defined region;

exchanging data by simultaneously using at least two communication systems corresponding to the moved at least two objects in response to the touch input;

when a first object of the plurality of objects is moved to a second object of the plurality of objects, exchanging data by simultaneously using first and second communication systems corresponding to the first and second objects; and when the first and second communication systems are not usable simultaneously, causing the first object to return to a previous location, at which the first object was located prior to moving to the second object.

10. The method of claim 9, wherein:
the plurality of objects are disposed along a preset geometric plane shape; and
the defined region is located within the preset geometric plane shape.

11. The method of claim 10, further comprising:
receiving a first pattern touch at a periphery of the preset geometric plane shape; and
determining that the at least two objects are selected in response to the first pattern touch.

12. The method of claim 11, further comprising:
receiving a second pattern touch at the periphery of the preset geometric plane shape such that at least one of the selected at least two objects are moved away from the preset geometric plane shape; and
excluding a communication system corresponding to the moved-away object from the data exchange.

13. The method of claim 9, wherein the plurality of objects are displayed either on a specific panel for displaying notification information for a service or on a specific region for displaying indicators indicating operating states of the mobile terminal.

14. The method of claim 9, further comprising:
activating at least two of the plurality of objects in response to toggling;
determining that the activated at least two objects are selected; and
exchanging data by simultaneously using at least two communication systems corresponding to the selected at least two objects.

15. The method of claim 9, further comprising displaying a new object instead of the first and second objects.

16. The method of claim 15, further comprising:
receiving a multi-touch of a specific pattern on the new object; and
displaying the first and second objects again instead of the new object in response to the multi-touch.

* * * * *